(12) United States Patent
Ogino et al.

(10) Patent No.: US 9,007,491 B2
(45) Date of Patent: Apr. 14, 2015

(54) IMAGE PROCESSING APPARATUS AND CONTROL METHOD THEREOF

(75) Inventors: Hiroshi Ogino, Kawasaki (JP); Yuji Koide, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 653 days.

(21) Appl. No.: 13/238,845

(22) Filed: Sep. 21, 2011

(65) Prior Publication Data

US 2012/0099007 A1   Apr. 26, 2012

(30) Foreign Application Priority Data

Oct. 21, 2010  (JP) ................................ 2010-236847

(51) Int. Cl.
*H04N 5/217* (2011.01)
*H04N 9/64* (2006.01)
*H04N 5/228* (2006.01)
*H04N 5/365* (2011.01)

(52) U.S. Cl.
CPC .................................. *H04N 5/3655* (2013.01)

(58) Field of Classification Search
USPC .............. 348/241–246, 251, 255, 222.1, 294, 348/249
See application file for complete search history.

(56) References Cited

U.S. PATENT DOCUMENTS

| 5,881,182 | A | 3/1999 | Fiete et al. |
| 7,689,059 | B2 | 3/2010 | Okada |
| 7,948,533 | B2 | 5/2011 | Koseki |
| 7,956,909 | B2 * | 6/2011 | Takahashi et al. ............ 348/243 |
| 7,982,785 | B2 | 7/2011 | Kinoshita et al. |
| 8,228,402 | B2 * | 7/2012 | Egawa ........................ 348/241 |
| 8,269,864 | B2 * | 9/2012 | Gerstenberger et al. ...... 348/243 |
| 8,421,888 | B2 | 4/2013 | Koseki |
| 8,441,560 | B2 | 5/2013 | Yanai |
| 2008/0239110 | A1 | 10/2008 | Hara |
| 2009/0103829 | A1 * | 4/2009 | Takahashi et al. ............ 382/260 |
| 2010/0231761 | A1 | 9/2010 | Yanai |
| 2011/0141324 | A1 | 6/2011 | Koseki |
| 2012/0099007 | A1 | 4/2012 | Ogino et al. |
| 2012/0224086 | A1 | 9/2012 | Takita |
| 2013/0093912 | A1 | 4/2013 | Uchida |

FOREIGN PATENT DOCUMENTS

| EP | 2053842 A | 4/2009 |
| JP | 2006-311086 | 11/2006 |

(Continued)

OTHER PUBLICATIONS

Jun. 20, 2014 Notice of Allowance that issued in related U.S. Appl. No. 13/879,123.

*Primary Examiner* — Ahmed A Berhan
(74) *Attorney, Agent, or Firm* — Cowan, Liebowitz & Latman, P.C.

(57) ABSTRACT

An image processing apparatus obtains a black image captured in the light-shielded state, and applies a cyclic type filter to each line in a direction parallel to the streak in the black image, reducing random noise in the first direction. The image processing apparatus deletes, from a black image obtained by applying the cyclic type filter, lines in the second direction by the group delay of the cyclic type filter. Further, the image processing apparatus generates an image having a line count corresponding to the group delay by using a final line in the second direction in the image from which lines corresponding to the group delay have been deleted. The image processing apparatus adds the generated image to the image from which lines corresponding to the group delay have been deleted, and outputs the resultant image.

8 Claims, 7 Drawing Sheets

(56) References Cited

FOREIGN PATENT DOCUMENTS

| JP | 2007-028026 | 2/2007 |
| JP | 2009-033321 | 2/2009 |
| JP | 2010-041437 A | 2/2010 |

* cited by examiner

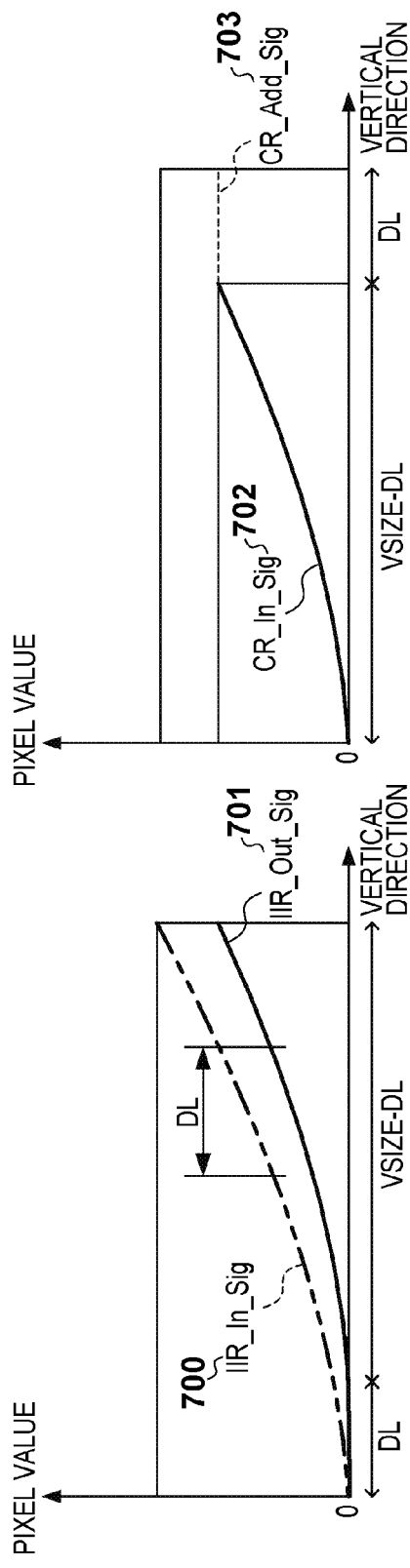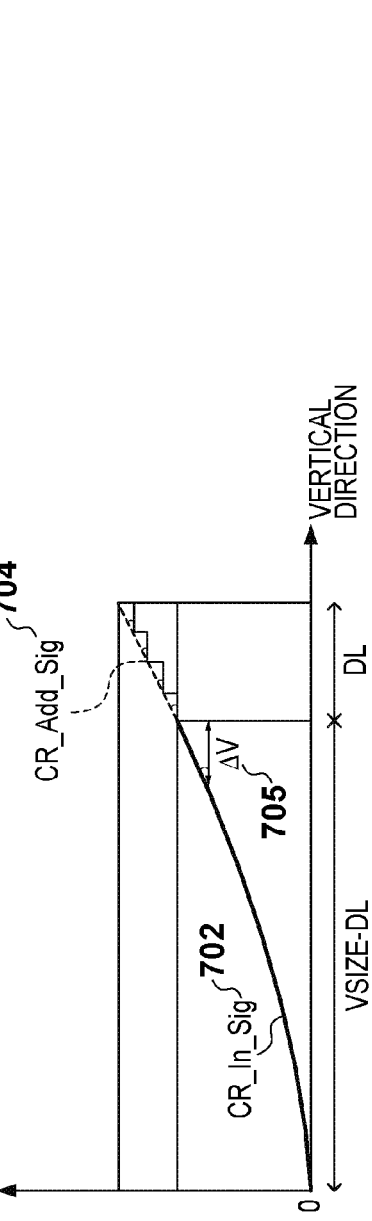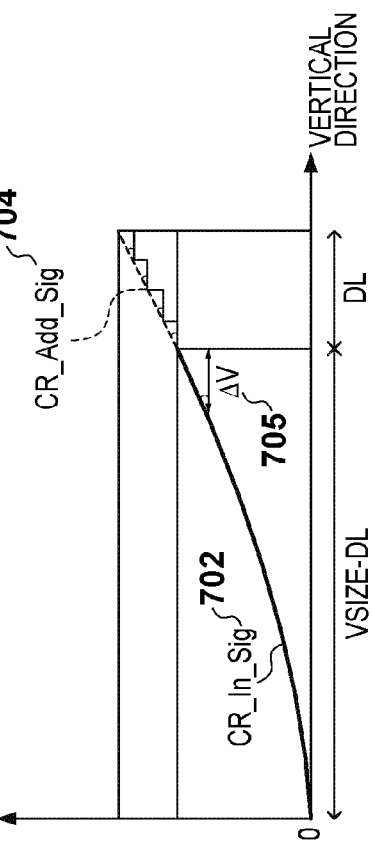

IMAGE PROCESSING APPARATUS AND CONTROL METHOD THEREOF

BACKGROUND OF THE INVENTION

1. Field of the Invention

The present invention relates to a technique of reducing fixed pattern noise in a captured image.

2. Description of the Related Art

An image sensor such as a CCD sensor or CMOS sensor sometimes generates streak-like fixed pattern noise called a "vertical streak" in a captured image owing to nonuniformity of a dark current in a vertical transfer root and degradation in transferring. As a method for correcting the generated fixed pattern noise, a technique, where the output signal (black image) of an image sensor that is obtained in a light-shielded state is stored in advance, and subtracted from a captured image (black subtraction process), is known.

However, the black image contains not only fixed pattern noise but also random noise. In an image obtained by subtracting a black image from a captured image, random noise stands out much more than in an image before subtraction. To prevent this, a technique is known whereby random noise from a black image is reduced to generate an extraction image which extracts streak-like fixed pattern noise.

Japanese Patent Laid-Open No. 2007-028026 discloses a technique of reducing random noise by applying a median filter using a row or column of an image sensor as one process unit. Japanese Patent Laid-Open No. 2009-033321 discloses a technique of reducing random noise in a region used for image capturing. More specifically, a light-shielded region not used for image capturing is set at the periphery of an image sensor. A dark current amount in the region used for image capturing is calculated from a dark current amount in image capturing that has been measured in the light-shielded region.

However, delay lines with ten-odd or more taps are sometimes necessary to sufficiently reduce random noise by the method of applying a filter for reducing random noise for each row or column, like Japanese Patent Laid-Open No. 2007-028026. This may increase the circuit scale.

The method of setting a light-shielded region around an image sensor, like Japanese Patent Laid-Open No. 2009-033321, may decrease the number of effective pixels of the image sensor or increase the circuit scale owing to expansion of the image sensor for setting the light-shielded region. In Japanese Patent Laid-Open No. 2009-033321, a dark current amount in the region used for image capturing is linearly estimated and calculated. Depending on the trend of change of a dark current amount in the region used for image capturing, no random noise may be appropriately reduced.

SUMMARY OF THE INVENTION

The present invention has been made to solve the above problems. The present invention provides appropriately reducing at least random noise in a direction parallel to a streak by a simple circuit arrangement in a black image having streak-like fixed pattern noise.

According to an aspect of the present invention, there is provided an image processing apparatus comprising: obtaining unit configured to obtain a black image which is captured in a light-shielded state and contains streak-like fixed pattern noise; first reduction unit configured to apply, to the black image obtained by the obtaining unit for each line of the black image in a first direction, a cyclic type filter for reducing noise in the first direction, and for weighted-adding, in a pixel order in the first direction, a pixel value of a pixel of interest and a pixel value of at least one pixel to which the cyclic type filter has been applied before the pixel of interest; and first output unit configured to delete, from the black image to which the first reduction unit has applied the cyclic type filter, lines in a second direction intersecting the first direction by a group delay of the cyclic type filter, generating an image having a line count corresponding to the group delay by using a final line in the second direction in the image from which the lines corresponding to the group delay have been deleted, adding the generated image to the image from which the lines corresponding to the group delay have been deleted, and outputting a resultant image.

Further features of the present invention will become apparent from the following description of exemplary embodiments (with reference to the attached drawings).

BRIEF DESCRIPTION OF THE DRAWINGS

FIGS. 7A, 7B, and 7C are graphs for explaining the rate of change of the streak intensity according to a modification of the present invention.

DESCRIPTION OF THE EMBODIMENTS

First Embodiment

A preferred embodiment of the present invention will now be described in detail with reference to the accompanying drawings. The following embodiment will exemplify an application of the present invention to a digital camera serving as an example of an image processing apparatus that can correct streak-like fixed pattern noise in a captured image by using a random noise-reduced black image. However, the present invention is applicable to an arbitrary device capable of reducing random noise contained in a black image.

Figure 1:
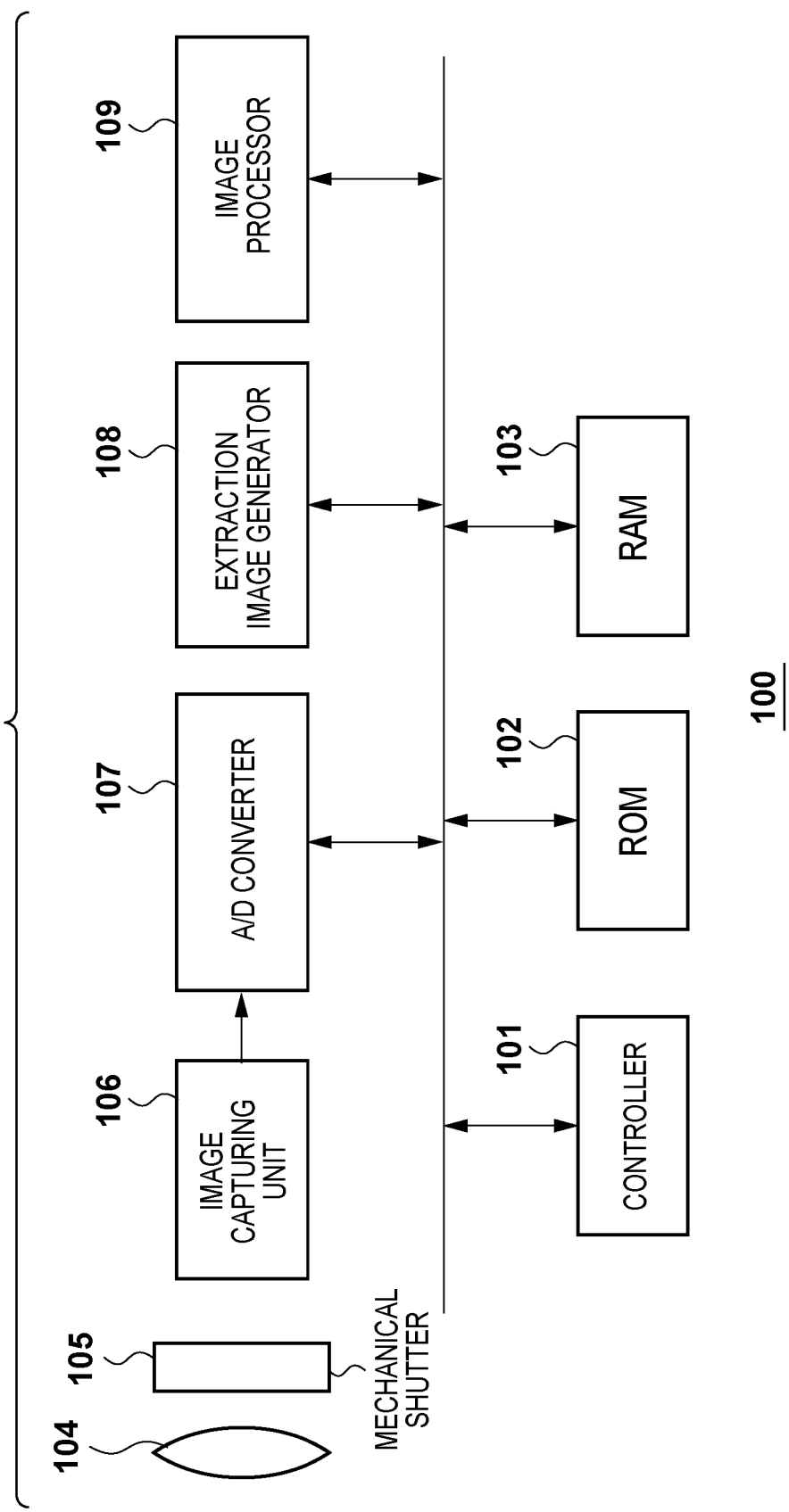
FIG. 1 is a block diagram exemplifying the functional arrangement of a digital camera according to an embodiment of the present invention.

FIG. 1 is a block diagram showing the functional arrangement of a digital camera 100 according to the embodiment of the present invention.

A controller 101 is, for example, a microprocessor. The controller 101 controls the operation of each block of the digital camera 100 by reading out the operation program of the block that is stored in a ROM 102, expanding it in a RAM 103, and executing it. The ROM 102 is, for example, a rewritable nonvolatile memory like a flash memory. In addition to the operation program of each block of the digital camera 100, the ROM 102 stores parameters, settings, and the like necessary for the operation of each block. The RAM 103 is a rewritable volatile memory and is a temporary storage area for data generated by each block of the digital camera 100. The RAM 103 also stores a correction black image for reducing streak-like fixed pattern noise from a captured image. The correction black image is an image which is obtained by reducing random noise from a black image captured in the light-shielded state and extracts streak-like fixed pattern noise.

An image capturing unit 106 includes an image sensor such as a CCD sensor or CMOS sensor. The image capturing unit 106 photo-electrically converts an optical image formed on the image sensor via an optical system 104, and outputs the obtained analog image signal to an A/D converter 107 (to be described later). A mechanical shutter 105 is a block which adjusts the exposure time by physically cutting off the optical path. In this specification, the A/D converter 107 (to be described later) A/D-converts an image captured in the light-shielded state in which the mechanical shutter 105 is completely closed in accordance with conditions to capture an image. Then, the RAM 103 stores the obtained image as a black image. The A/D converter 107 applies an A/D conversion process to an input analog image signal, obtaining a digital image.

An extraction image generator 108 is a block which reduces random noise other than streak-like fixed pattern noise in a black image captured in the light-shielded state, and outputs a correction image for reducing streak-like fixed pattern noise. More specifically, the extraction image generator 108 generates a black image which extracts streak-like fixed pattern noise in order to reduce streak-like fixed pattern noise from an image captured while the mechanical shutter 105 is open.

An image processor 109 outputs an image from which streak-like fixed pattern noise is reduced by subtracting, from an image captured while the mechanical shutter 105 is open, the black image which is generated by the extraction image generator 108 and extracts streak-like fixed pattern noise. Further, the image processor 109 performs various signal processes such as color separation, aperture correction, gamma correction, and white balance correction for the streak-like fixed pattern noise-reduced image.

Extraction of Fixed Pattern Noise

A process sequence to generate a black image used to correct streak-like fixed pattern noise in the digital camera 100 having the above arrangement according to the embodiment will be further explained below with reference to the accompanying drawings.

First, the controller 101 obtains image capturing parameters such as the sensitivity setting and exposure time set in the digital camera 100 when, for example, opening the mechanical shutter 105 to capture an image. Then, the controller 101 closes the mechanical shutter 105, and outputs an analog image signal from the image capturing unit 106 to the A/D converter 107 in the light-shielded state under the same conditions as the obtained image capturing parameters. The controller 101 controls the A/D converter 107 to A/D-convert the input analog image signal and output a black image. The controller 101 controls the RAM 103 to store the black image output from the A/D converter 107. At this time, the black image stored in the RAM 103 contains streak-like fixed pattern noise and random noise. The black image may be image data thinned by reading out at least one or more fields by field reading.

The controller 101 reads out, from the RAM 103, the black image containing streak-like fixed pattern noise and random noise, and outputs it to the extraction image generator 108. The controller 101 controls the extraction image generator 108 to generate a random noise-reduced correction black image, that is, an extraction image which extracts streak-like fixed pattern noise.

Figure 2:
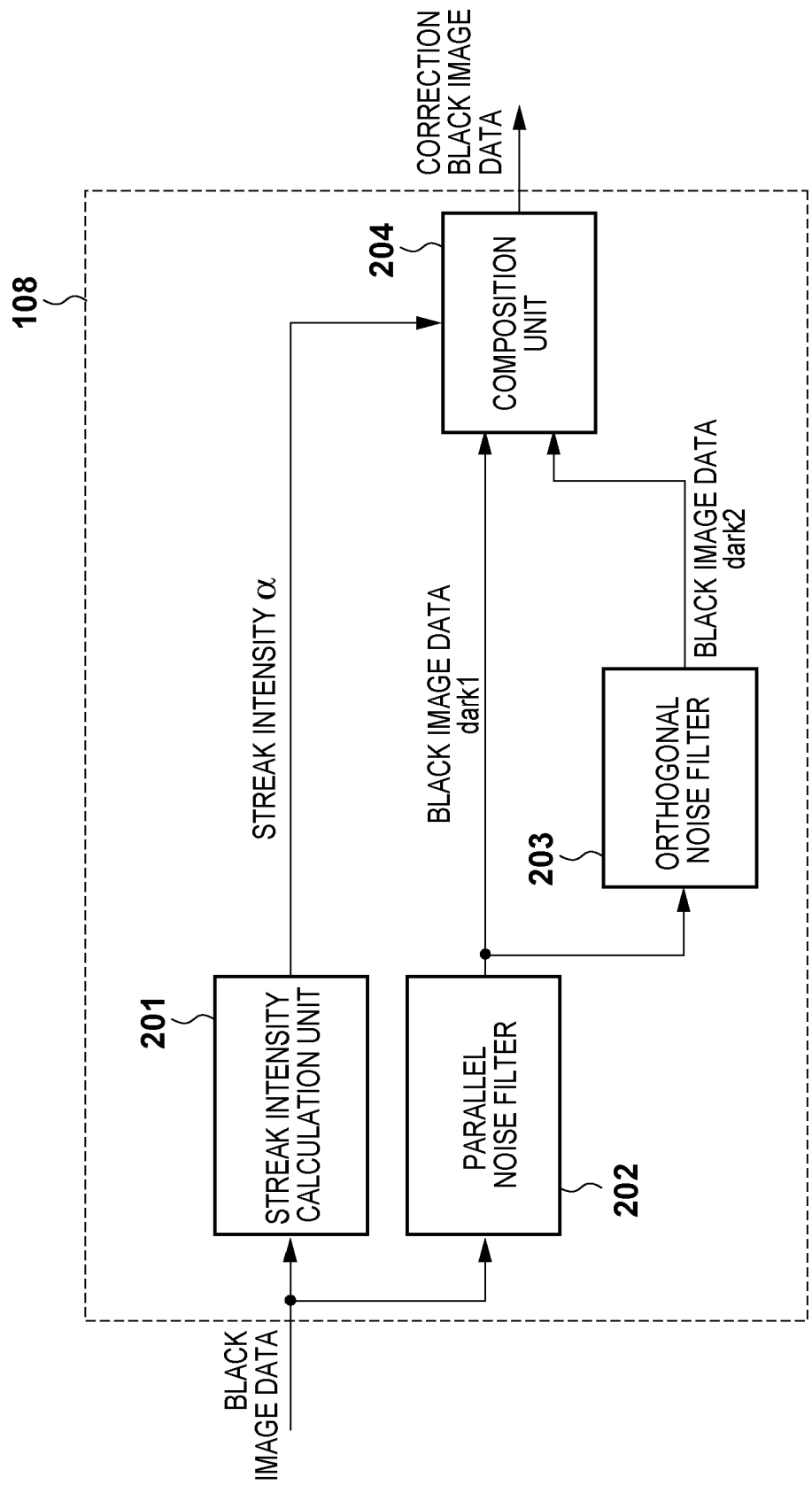
FIG. 2 is a block diagram exemplifying the functional arrangement of an extraction image generator in FIG. 1.
Figure 6:
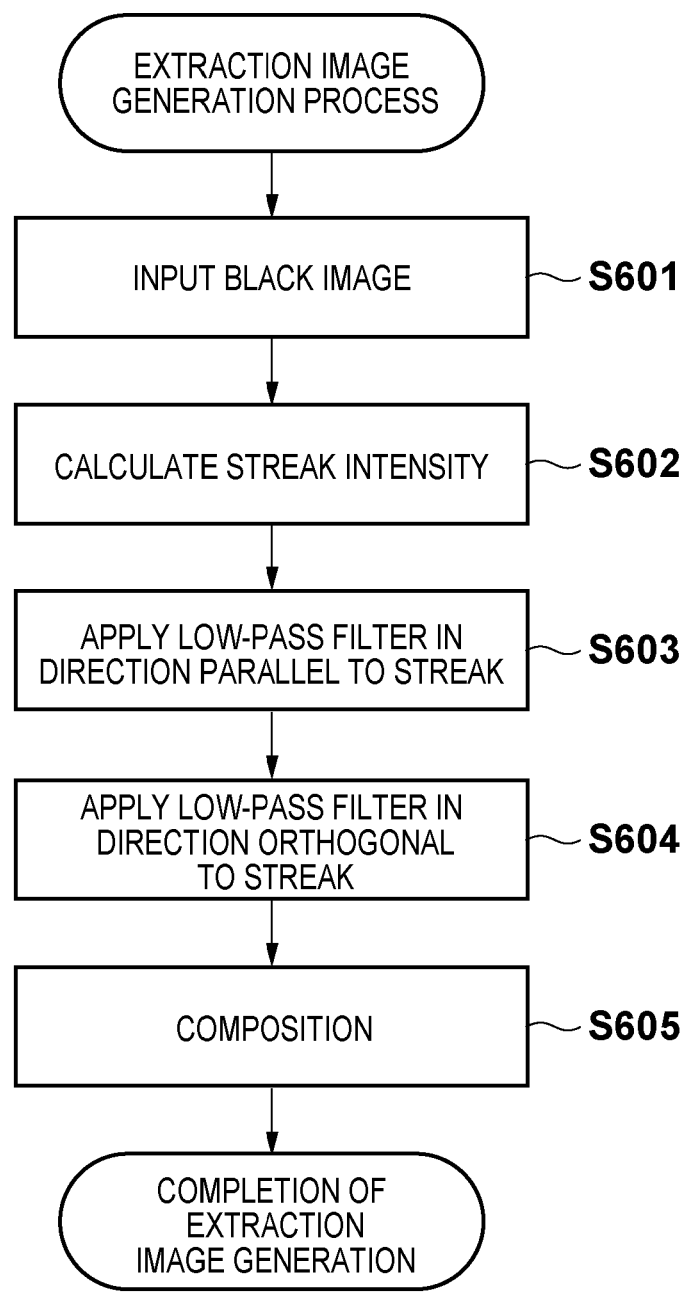
FIG. 6 is a flowchart showing the sequence of a process by the extraction image generator in FIG. 1.

An extraction image generation process by the extraction image generator 108 will be explained below with reference to the block diagram of FIG. 2 and the flowchart of FIG. 6. When a black image read out from the RAM 103 is input to the extraction image generator 108, it is input to a streak intensity calculation unit 201 and parallel noise filter 202 (step S601).

Figure 3:
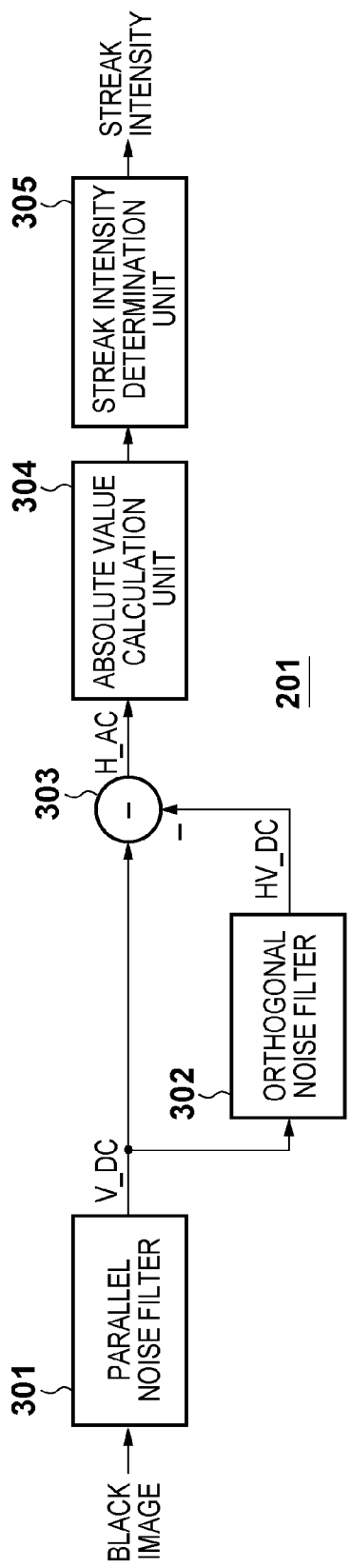
FIG. 3 is a block diagram exemplifying the circuit arrangement of a streak intensity calculation unit in FIG. 2.

The streak intensity calculation unit 201 has a circuit arrangement as shown in FIG. 3. The streak intensity calculation unit 201 detects the intensity of streak-like fixed pattern noise (amplitude of streak-like fixed pattern noise) contained in the black image for each region (step S602). More specifically, a region containing a target pixel is set for each target pixel in the black image input to the streak intensity calculation unit 201. Each block executes a process for each region of the black image, determining a streak intensity α indicating the streak intensity of each target pixel.

First, to remove a high-frequency component parallel to a streak, a parallel noise filter 301 applies, to each region of the input black image, a low-pass filter in a direction parallel to the streak. More specifically, when streak-like fixed pattern noise contained in the black image is a streak generated in the vertical (V) direction of the image, the parallel noise filter 301 outputs the vertical DC component of each region of the black image input to the streak intensity calculation unit 201. Note that the low-pass filter in a direction parallel to the streak can be a filter configured to average the values of a predetermined number of pixels such as 25 pixels which contain a pixel of interest as a center and have the same coordinate in the horizontal (H) direction as that of the pixel of interest in a direction parallel to the streak.

Then, to remove a high-frequency component in a direction orthogonal to the streak, an orthogonal noise filter 302 applies a low-pass filter in a direction orthogonal to the streak, to a DC component in a direction parallel to the streak in each region of the black image that has been output from the parallel noise filter 301. Accordingly, the orthogonal noise filter 302 outputs a two-dimensional DC component for each region of the black image input to the streak intensity calculation unit 201.

A subtracter 303 subtracts the thus-obtained DC component in a direction parallel to the streak in each region of the black image input to the streak intensity calculation unit 201, and the two-dimensional DC component in each region of the black image. More specifically, the subtracter 303 subtracts the two-dimensional DC component in each region of the black image from the DC component in a direction parallel to the streak in each region of the black image, thereby deriving an AC component in a direction orthogonal to the streak in each pixel of the black image.

An absolute value calculation unit 304 converts the AC component in a direction orthogonal to the streak in each pixel of the black image that has been output from the subtracter 303, into the absolute value of the AC component, and outputs the absolute value to a streak intensity determination unit 305. The streak intensity determination unit 305 determines the streak intensity α of each pixel of the black image in accordance with the input absolute value of the AC component. More specifically, the streak intensity determination unit 305 determines the streak intensity of each pixel of the black image using, for example, a function as shown in FIG. 4.

Figure 4:
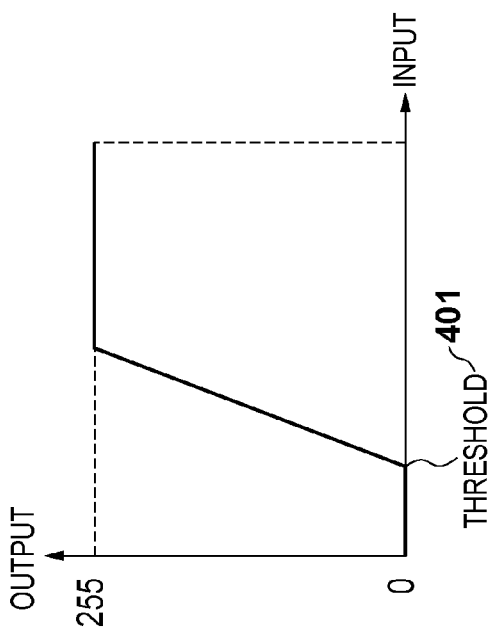
FIG. 4 is a graph for explaining the streak intensity according to the embodiment of the present invention.

In FIG. 4, the abscissa indicates the absolute value of the AC component, and the ordinate indicates the streak intensity.

The streak intensity is given by, for example, an 8-bit value. A streak intensity of 0 means that the target pixel is not a streak, and a streak intensity of 255 means that the target pixel is a streak. Also, a streak intensity of 1 to 254 means a streak at which it is difficult to determine whether the target pixel is a streak. Note that a threshold 401 in FIG. 4 may be a value at which the absolute value of the AC component in a direction orthogonal to the streak is much smaller than the amplitude of random noise and no streak-like fixed pattern noise can be recognized. The streak intensity determination unit 305 normalizes the determined streak intensity and outputs the streak intensity $\alpha(\leq 1)$.

Further, to reduce random noise serving as a high-frequency component in a direction parallel to the streak, the parallel noise filter 202 applies, to the input black image, a low-pass filter in a direction parallel to the streak (step S603). A random noise reduction process in a direction parallel to the streak that is executed by the parallel noise filter 202 according to the embodiment will be explained in detail with reference to FIG. 5.

An IIR filter 501 applies, to the black image input to the parallel noise filter 202, a process of reducing random noise in a direction parallel to the streak. The IIR filter 501 is a cyclic type filter, and performs a process of reducing random noise in a direction parallel to a streak for each line in a direction parallel to the streak. More specifically, the IIR filter 501 sets a pixel of interest in a pixel order in a direction parallel to the streak. The IIR filter 501 calculates a pixel value after reduction by weighted-adding the pixel value of the pixel of interest and that of at least one pixel output after applying the filter before the pixel of interest. For example, weighted-adding using a filter-applied pixel at a coordinate immediately preceding the pixel of interest can be given by equation (1):

$$Y(t)=\beta \times X(t)+(1-\beta) \times Y(t-1) \quad (1)$$

where X(t) is the pixel value of the pixel of interest, Y(t) is a pixel value after random noise reduction, and $\beta$ is a cyclic coefficient serving as a weighting coefficient. The cyclic coefficient $\beta$ can be set in accordance with the amplitude of random noise in the pixel of interest. For example, when an arrangement which detects the amplitude of random noise on each line in a direction parallel to a streak exists on the preceding stage of the IIR filter 501, the cyclic coefficient $\beta$ of the IIR filter 501 is set as follows based on the amplitude of random noise on the line of the pixel of interest. More specifically, the cyclic coefficient $\beta$ is set to decrease the weight of the pixel of interest for a larger amplitude of random noise on a line in a direction parallel to the streak of the pixel of interest. The use of the cyclic type filter can reduce random noise without requiring many delay lines.

The black image to which the IIR filter 501 has applied the cyclic type filter is input to an output controller 502. At this time, the cyclic type filter-applied input black image has a group delay in accordance with the number of output pixels to which the filter has been applied before the pixel of interest referred to in the process of the IIR filter 501, or an interval from a pixel to be referred to. The output controller 502 deletes lines in a direction orthogonal to the streak by the group delay generated in the cyclic type filter-applied black image. Then, the output controller 502 sets, as the first line, a line corresponding to the first line in a direction orthogonal to the streak in the black image input to the parallel noise filter 202, that is, a line next to the deleted line. For example, when the black image input to the parallel noise filter 202 contains streak-like fixed pattern noise in the vertical direction, the output controller 502 outputs an image having a line count obtained by subtracting a line count DL corresponding to the group delay from the vertical line count VSIZE of the black image. More specifically, when streak-like fixed pattern noise exists in the vertical direction, the output controller 502 outputs an image obtained by deleting horizontal lines by a line count corresponding to the group delay from the input image.

A signal generator 503 generates an image having a line count corresponding to the group delay in a direction orthogonal to the streak, for the image which has been output from the output controller 502 after deleting lines corresponding to the group delay in a direction orthogonal to the streak. The signal generator 503 then adds the generated image to the image from which lines corresponding to the group delay have been deleted. More specifically, the signal generator 503 generates an image having a line count corresponding to the group delay by replicating a final line in a direction orthogonal to the streak in the input image from which lines corresponding to the group delay have been deleted. The signal generator 503 then adds the generated image to the input image. That is, the signal generator 503 adds a final line in a direction orthogonal to the streak by the line count corresponding to the group delay after the final line of the image from which lines corresponding to the group delay have been deleted, thereby generating and outputting an image equal in size to the black image input to the parallel noise filter 202.

By using the IIR filter 501, output controller 502, and signal generator 503, the parallel noise filter 202 can output a black image in which random noise in a direction parallel to the streak has been reduced.

An orthogonal noise filter 203 applies a low-pass filter in a direction orthogonal to the streak, to the black image output from the parallel noise filter 202 to which the low-pass filter in a direction parallel to the streak has been applied (step S604). Note that the low-pass filter in a direction orthogonal to the streak can be a filter configured to average the values of a predetermined number of pixels such as 25 pixels which contain a pixel of interest as a center and have the same coordinate as that of the pixel of interest in a direction orthogonal to the streak.

The filter coefficients (for example, a predetermined number of pixel values) of the low-pass filters in directions parallel to and orthogonal to the streak may be set in accordance with the amplitude of random noise to be reduced. The filter coefficients may be set in advance for a pattern of image capturing conditions such as the sensitivity setting, stored in the ROM 102, and read out in a process of generating a black image used to correct streak-like fixed pattern noise.

A composition unit 204 receives the streak intensity $\alpha$ output from the streak intensity calculation unit 201, a black image dark1 output from the parallel noise filter 202, and a black image dark2 output from the orthogonal noise filter 203, and composites them (step S605). More specifically, the composition unit 204 composites the pixel values of respective pixels by weighted-adding in accordance with equation (2), thereby generating a correction black image "hosei_dark" which extracts streak-like fixed pattern noise by reducing random noise:

$$\text{hosei\_dark}=\alpha \times \text{dark1}+(1-\alpha) \times \text{dark2} \quad (2)$$

Accordingly, the weight of the black image to which the low-pass filter in a direction parallel to the streak has been applied can be decreased for a pixel lower in streak intensity. That is, for a pixel having no streak or a pixel small in streak amplitude, applying the low-pass filter in a direction parallel to the streak adversely increases the streak amplitude. To prevent this, the degree of applying the low-pass filter in a direction parallel to the streak is decreased. In contrast, increasing the degree of applying the low-pass filter in a direction orthogonal to the streak can reduce random noise in a direction orthogonal to the streak. Therefore, random noise can be properly reduced in each pixel of the black image. Since the streak intensity α can be set for each pixel, generation of an over-corrected region can be suppressed even if the streak intensity changes on a single streak. Shading can also be corrected similarly to a conventional black subtraction process. Note that no black image need always be captured in every shooting. It suffices to capture a black image in accordance with the characteristics of the image sensor, as needed.

As described above, the image processing apparatus according to the embodiment can appropriately reduce at least random noise in a direction parallel to a streak by a simple circuit arrangement in a black image having streak-like fixed pattern noise. More specifically, the image processing apparatus obtains a black image captured in the light-shielded state, and applies a cyclic type filter to each line in a direction parallel to the streak in the black image, reducing random noise in a direction parallel to the streak. The image processing apparatus deletes, from a black image obtained by applying the cyclic type filter, lines in a direction orthogonal to the streak by the group delay of the cyclic type filter. Further, the image processing apparatus generates an image having a line count corresponding to the group delay by using a final line in a direction orthogonal to the streak in the image from which lines corresponding to the group delay have been deleted. The image processing apparatus adds the generated image to the image from which lines corresponding to the group delay have been deleted, and outputs the resultant image.

Modification

The above-described embodiment has described a method of replicating the final line of an image from which lines corresponding to the group delay of the cyclic type filter have been deleted, thereby generating an image which has a line count corresponding to the group delay and is to be added to the image from which lines corresponding to the group delay have been deleted. The method of replicating and adding a final line, like the above-described embodiment, is effective when, for example, the rate of change of the pixel value on a line in a direction parallel to a streak on which streak-like fixed pattern noise exists can be approximated to 0 or a line count corresponding to the group delay is smaller than the total line count.

For example, a case in which a rate IIR_In_Sig 701 of change of the pixel value of streak-like fixed pattern noise on a line in a direction parallel to the streak is high, as shown in FIG. 7A, will be examined. Lines corresponding to a group delay are deleted from an output IIR_Out_Sig 702 from the IIR filter 501. The final line of the image from which lines corresponding to the group delay have been deleted is replicated, generating an image having a line count corresponding to the group delay. FIG. 7B shows the rate of change of the pixel value at this time. As is also apparent from FIG. 7B, when the rate of change of the pixel value of streak-like fixed pattern noise is high, a black image in which random noise in a direction parallel to the streak is appropriately reduced cannot be obtained even by adding an image CR_Add_Sig 703 generated by replicating the final line. In particular, the group delay increases when the amplitude of random noise in a direction parallel to the streak is large and the cyclic coefficient β is set to decrease the weight of the pixel value of the pixel of interest. A shift from the pixel value of actual fixed pattern noise may increase.

The modification will explain a method of generating an image having a line count corresponding to a group delay when the rate of change of the pixel value on a line in a direction parallel to a streak on which streak-like fixed pattern noise exists cannot be approximated to 0 or the rate of change of the pixel value varies. In the modification, the same reference numerals as those in the above embodiment denote blocks each having the same arrangement, and a description thereof will not be repeated. Only a characteristic arrangement in the modification will be explained.

Figure 8:
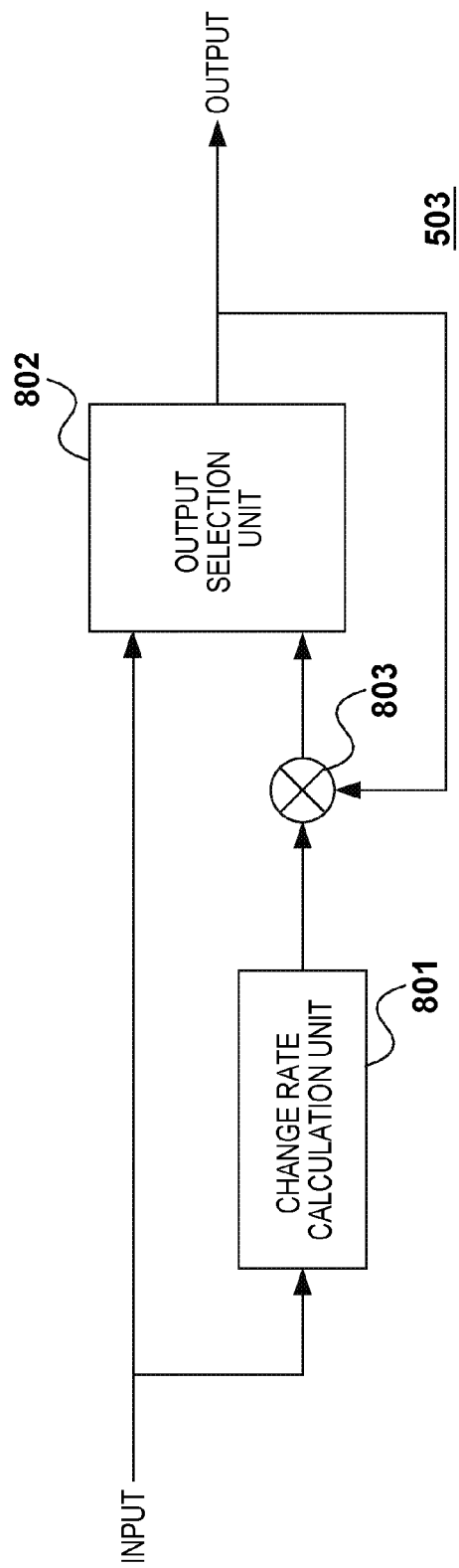
FIG. 8 is a diagram showing the circuit arrangement of a signal generator in FIG. 5 according to the modification of the present invention.

FIG. 8 is a diagram showing the circuit arrangement of the signal generator 503 in the modification. In the modification, a change rate calculation unit 801 and output selection unit 802 receive an image input to the signal generator 503 from which lines corresponding to a group delay in a direction orthogonal to a streak have been deleted.

The change rate calculation unit 801 calculates the rate of change of the pixel value of fixed pattern noise in a direction parallel to the streak on any line in a direction parallel to the streak on which streak-like fixed pattern noise of the input image exists. More specifically, the change rate calculation unit 801 obtains the rate of change in the pixel value of the fixed pattern noise between lines for every predetermined number ΔV of lines from a final line in a direction orthogonal to the streak in the input image. Then, the change rate calculation unit 801 calculates the average of all the rates of change, obtaining the rate γ of change of the pixel value of the fixed pattern noise in a direction parallel to the streak.

Note that the inclination of change of the pixel value of streak-like fixed pattern noise on a line in a direction parallel to the streak can be considered to be constant regardless of the line. In the modification, therefore, the rate of change is calculated for a line in a direction parallel to one streak. However, the practice of the present invention is not limited to this. For example, it is also possible to calculate and average rates of change of the pixel value of fixed pattern noise for lines in a direction parallel to a plurality of streaks.

Figure 5:
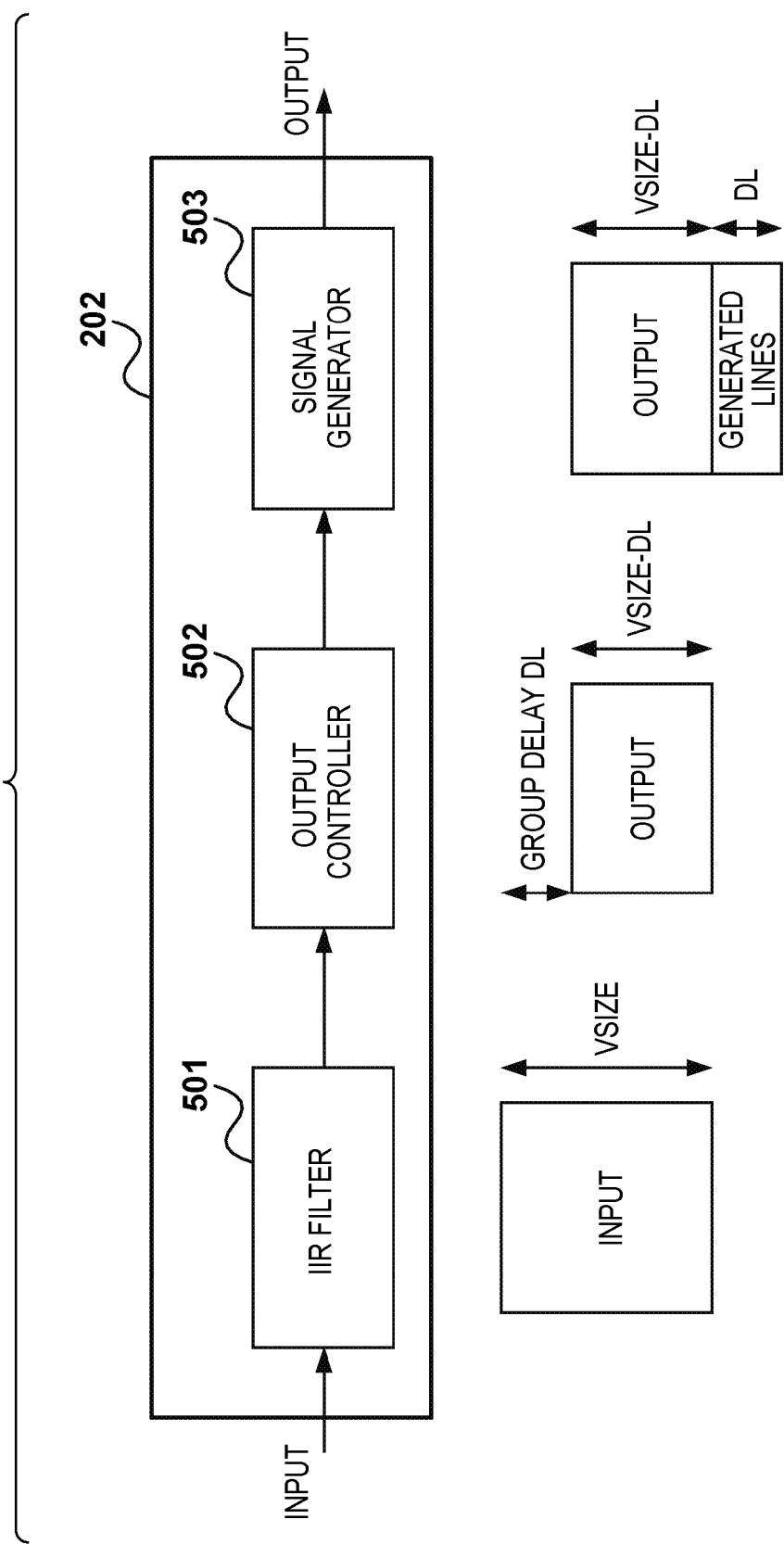
FIG. 5 is a block diagram exemplifying the circuit arrangement of a parallel noise filter in FIG. 2.

The output selection unit 802 is a block which switches the output between an image input to the signal generator 503 or an image input from a multiplier 803 (to be described later). For example, when streak-like fixed pattern noise is generated in the vertical direction and the output controller 502 deletes horizontal lines by DL lines, as shown in FIG. 5, the output selection unit 802 switches the output as follows. First, the output selection unit 802 switches the input after outputting all the lines of an image which has been input to the signal generator 503 and has VSIZE-DL lines in the vertical direction, and outputs an image output from the multiplier 803 by DL lines.

The multiplier 803 multiplies the input image by the value of the rate γ of change calculated by the change rate calculation unit 801, generating an image when the pixel value of fixed pattern noise changes at this rate of change. The multiplier 803 receives, for each line in a direction orthogonal to the streak, an image output from the output selection unit 802. The multiplier 803 suffices to multiply, by the rate γ of change, the pixel value of at least a pixel having fixed pattern noise out of pixels on the input line. More specifically, the pixel value Y(t) of a given pixel that is output from the multiplier 803 is given by equation (3) using the pixel value Y(t−1) of a pixel which has the same coordinate as that of the given pixel in a direction orthogonal to the streak and has been output from the output selection unit 802 immediately before the given pixel:

$$Y(t)=Y(t-1)\times\gamma \qquad (3)$$

In the modification, the pixel value of at least a pixel having fixed pattern noise is multiplied by the rate γ of change. However, the practice of the present invention is not limited to this, and all the pixels of an input line may be multiplied by the rate γ of change. This is because the present invention applies a process to a black image having streak-like fixed pattern noise and it is considered that the pixel value of a pixel having no fixed pattern noise is sufficiently small and is not affected even by multiplying the pixel value by the rate γ of change.

By the above process, even when the rate of change of the pixel value of fixed pattern noise is high, the signal generator 503 in the modification can add an image having a line count corresponding to a group delay to an image from which lines corresponding to the group delay in a direction orthogonal to the streak have been deleted, and can output the resultant image. More specifically, the signal generator 503 calculates the rate γ of change of the pixel value of fixed pattern noise from a predetermined number ΔV of lines from a final line in a direction orthogonal to the streak in an input image, as shown in FIG. 7C. An image CR_Add_Sig 704 which has a line count corresponding to the group delay and is to be added is generated by multiplying pixels replicated from a final line in a direction orthogonal to the streak in the input image so that the pixel value of fixed pattern noise changes at the rate γ of change.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-236847, filed Oct. 21, 2010, which is hereby incorporated by reference herein in its entirety.

What is claimed is:

1. An image processing apparatus comprising:
at least one processor or at least one circuit;
a memory which is coupled to the at least one processor or the at least one circuit and stores instructions which cause the at least one processor or the at least one circuit to perform operation of following units of the image processing apparatus:
an obtaining unit configured to obtain a black image which is captured in a light-shielded state and contains streak-like fixed pattern noise;
a first reduction unit configured to apply, to the black image obtained by said obtaining unit for each line of the black image in a first direction, a recursive filter which weighted-adds, in a pixel order in the first direction, a pixel value of a pixel of interest and a pixel value of at least one pixel to which the recursive filter has been applied before the pixel of interest in order to reduce noise in the first direction; and a first output unit configured to delete, from the black image to which said first reduction unit has applied the recursive filter, lines in a second direction intersecting the first direction by a group delay of the recursive filter, generate an image having a line count corresponding to the group delay by using a final line in the second direction in the image from which the lines corresponding to the group delay have been deleted, add the generated image to the image from which the lines corresponding to the group delay have been deleted, and output a resultant image.

2. The apparatus according to claim 1, wherein said first output unit generates the image having the line count corresponding to the group delay, by replicating the final line in the second direction in the image from which the lines corresponding to the group delay have been deleted.

3. The apparatus according to claim 1, wherein the memory further stores instructions which cause the at least one processor or the at least one circuit to perform operation of a calculation unit configured to calculate a rate of change of a pixel value of the fixed pattern noise in the first direction on a line in the first direction on which the fixed pattern noise exists in the black image to which said first reduction unit has applied the recursive filter,
wherein when the rate of change of the fixed pattern noise that has been calculated by said calculation unit exceeds a predetermined value, said first output unit generates the image having the line count corresponding to the group delay to change the pixel value of the fixed pattern noise at the rate of change on a line in the first direction on which the pixel value of the streak-like fixed pattern noise exists.

4. The apparatus according to claim 1, wherein the memory further stores instructions which cause the at least one processor or the at least one circuit to perform operation of a detection unit configured to detect an amplitude of noise in the first direction,
wherein said first reduction unit reduces a weight of the pixel of interest for a larger amplitude of random noise in the first direction that has been detected by said detection unit.

5. The apparatus according to claim 1, wherein the memory further stores instructions which cause the at least one processor or the at least one circuit to perform operation of following units:
a deriving unit configured to derive, for each pixel of the black image obtained by said obtaining unit, an alternating component in the second direction in a region containing the pixel;
a determination unit configured to determine an intensity of the streak in each pixel of the black image in accordance with an absolute value of the alternating component in the second direction that has been derived by said deriving unit;
a second reduction unit configured to apply, to the black image output from said first output unit, a filter for reducing noise in the second direction; and
a second output unit configured to weighted-add the black image output from said first output unit and the black image to which the filter for reducing noise in the second direction has been applied, and generating an extraction image which extracts the streak-like fixed pattern noise of the captured black image,
wherein said second output unit performs weighted-adding to increase a weight of the black image output from said first output unit for a pixel having a lower intensity of the streak that has been determined by said determination unit.

6. The apparatus according to claim 5, wherein the filter for reducing random noise in the second direction is a filter configured to average, for a pixel of interest, a predetermined number of pixels having the same coordinate as a coordinate of the pixel of interest in the first direction.

7. The apparatus according to claim 1, wherein the first direction is a direction parallel to the streak, and the second direction is a direction orthogonal to the streak.

8. A method of controlling an image processing apparatus, wherein the image processing apparatus comprises at least one processor or at least one circuit; and a memory which is coupled to the at least one processor or the at least one circuit and stores instructions which cause the at least one processor or the at least one circuit to perform operation of following steps of the method:

an obtaining step of obtaining a black image which is captured in a light-shielded state and contains streak-like fixed pattern noise;

a first reduction step of applying, to the black image obtained in the obtaining step for each line of the black image in a first direction, a recursive filter which weighted-adds, in a pixel order in the first direction, a pixel value of a pixel of interest and a pixel value of at least one pixel to which the recursive filter has been applied before the pixel of interest in order to reduce noise in the first direction; and a first output step of deleting, from the black image to which the recursive filter has been applied in the first reduction step, lines in a second direction intersecting the first direction by a group delay of the recursive filter, generating an image having a line count corresponding to the group delay by using a final line in a direction orthogonal to the streak in the image from which the lines corresponding to the group delay have been deleted, adding the generated image to the image from which the lines corresponding to the group delay have been deleted, and outputting a resultant image.

\* \* \* \* \*